(12) United States Patent
Wilmot et al.

(10) Patent No.: US 9,739,294 B2
(45) Date of Patent: Aug. 22, 2017

(54) VENTED PRESSURIZED GAS-POWERED ACTUATOR

(71) Applicant: TK Holdings Inc., Auburn Hills, MI (US)

(72) Inventors: Larry Wilmot, Oxford, MI (US); Rachid Hammoud, Windsor (CA)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/299,804

(22) Filed: Jun. 9, 2014

(65) Prior Publication Data
US 2014/0360357 A1 Dec. 11, 2014

Related U.S. Application Data

(60) Provisional application No. 61/832,553, filed on Jun. 7, 2013, provisional application No. 61/835,515, filed on Jun. 14, 2013.

(51) Int. Cl.
| | | |
|---|---|---|
| *F15B 15/19* | (2006.01) | |
| *F15B 15/14* | (2006.01) | |
| *F15B 21/04* | (2006.01) | |
| *B60R 21/38* | (2011.01) | |

(52) U.S. Cl.
CPC .......... *F15B 15/149* (2013.01); *F15B 21/044* (2013.01); *B60R 21/38* (2013.01); *F15B 15/1428* (2013.01); *F15B 15/19* (2013.01)

(58) Field of Classification Search
CPC ...................................................... F15B 15/19
See application file for complete search history.

(56) References Cited

U.S. PATENT DOCUMENTS

| | | | | |
|---|---|---|---|---|
| 1,417,922 | A * | 5/1922 | Koch | ........................... 89/43.01 |
| 3,171,631 | A | 3/1965 | Aspinwall | |
| 4,166,522 | A | 9/1979 | Bourcier de Carbon | |
| 5,797,593 | A | 8/1998 | Oyaizu | |
| 5,971,117 | A | 10/1999 | Grundei et al. | |
| 6,568,184 | B2 | 5/2003 | Blackburn et al. | ............. 60/636 |
| 6,672,194 | B2 | 1/2004 | Daoud | ........................... 89/1.14 |
| 2005/0000352 | A1 | 1/2005 | Yamaguchi et al. | ......... 92/169.1 |
| 2011/0266801 | A1 | 11/2011 | Sainio | |
| 2012/0255432 | A1 | 10/2012 | Harper et al. | |

FOREIGN PATENT DOCUMENTS

| | | |
|---|---|---|
| DE | 102011106513 | 12/2012 |
| EP | 0852303 | 8/1998 |

* cited by examiner

*Primary Examiner* — F. Daniel Lopez
(74) *Attorney, Agent, or Firm* — L.C. Begin & Associates, PLLC

(57) ABSTRACT

A vented pressurized gas-powered actuator includes a housing having a central longitudinal axis and an inner surface. The inner surface has a constant radius between first and second planes extending perpendicular to the axis. At least one vent groove extends from the inner surface in a direction away from the axis. The at least one groove has a first end intersecting the first plane.

14 Claims, 13 Drawing Sheets

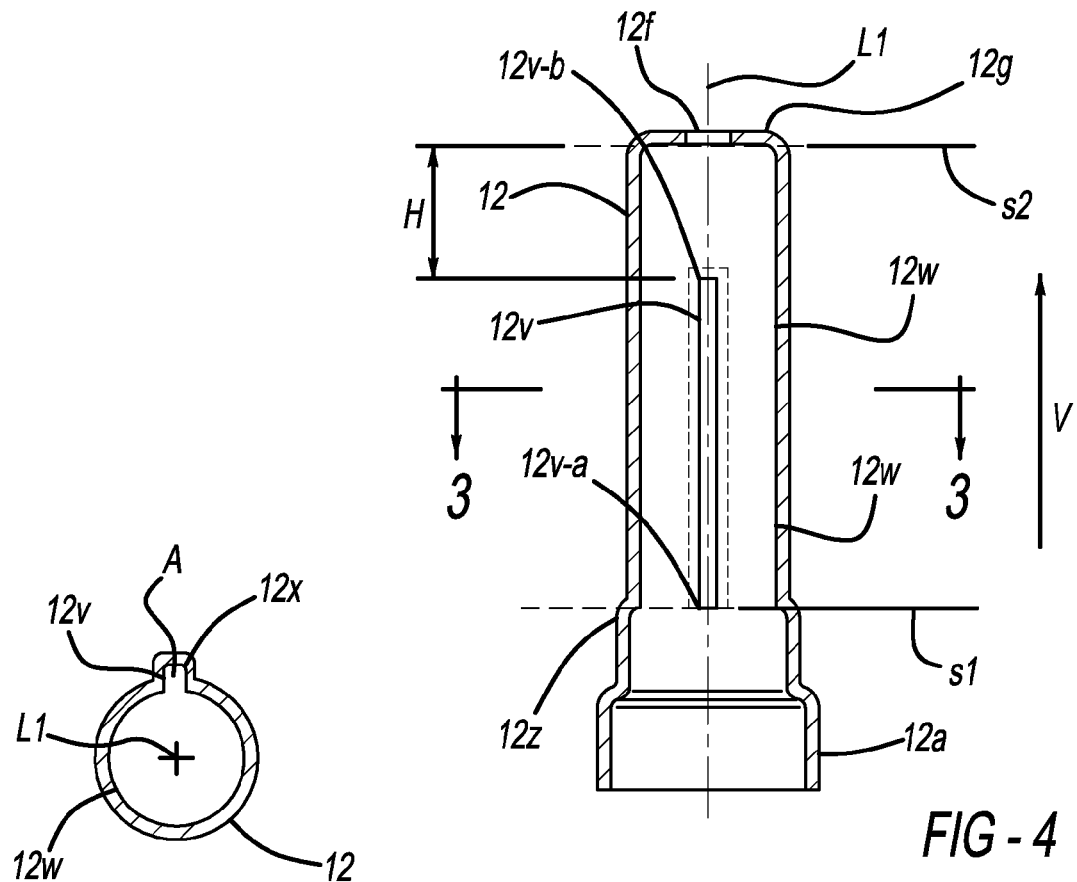
FIG - 4
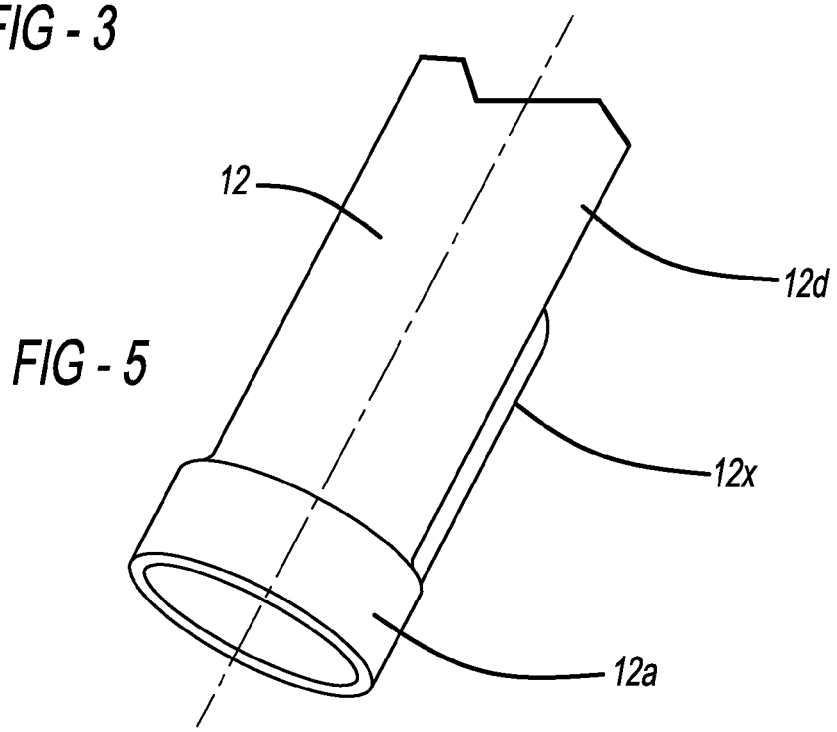
FIG - 3
FIG - 5

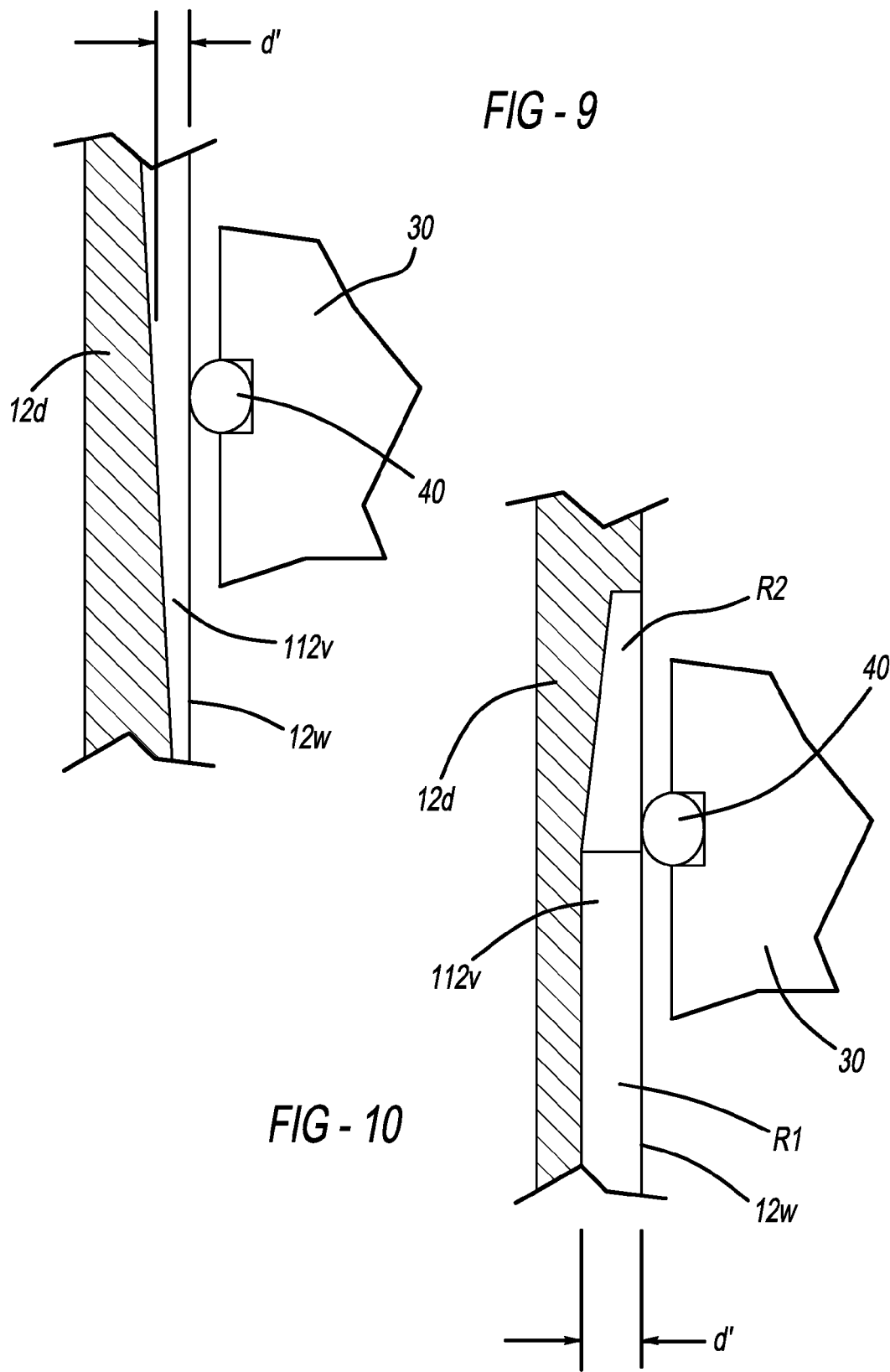

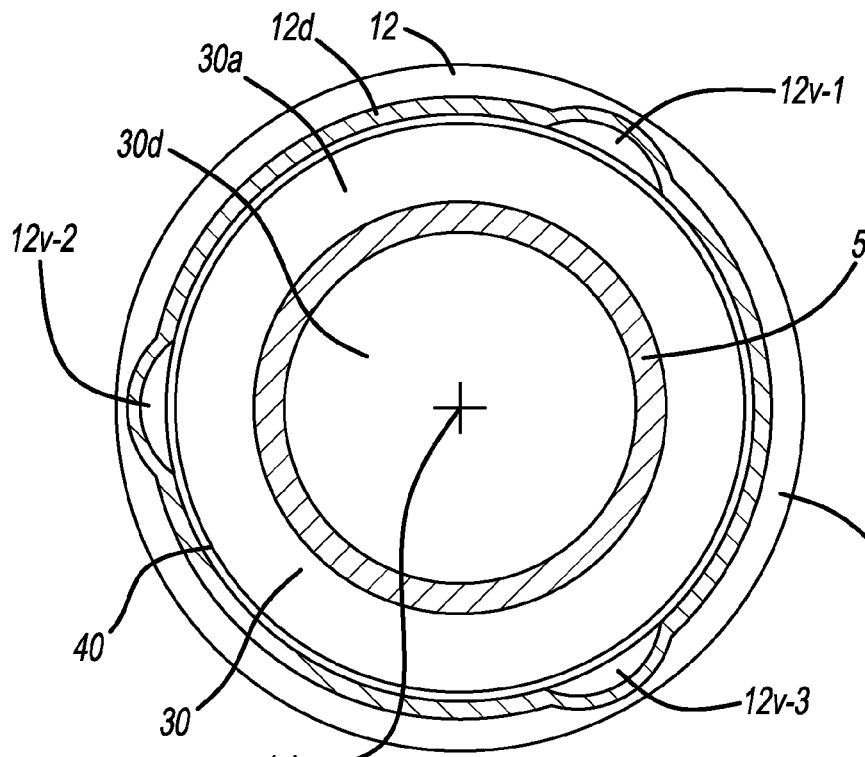
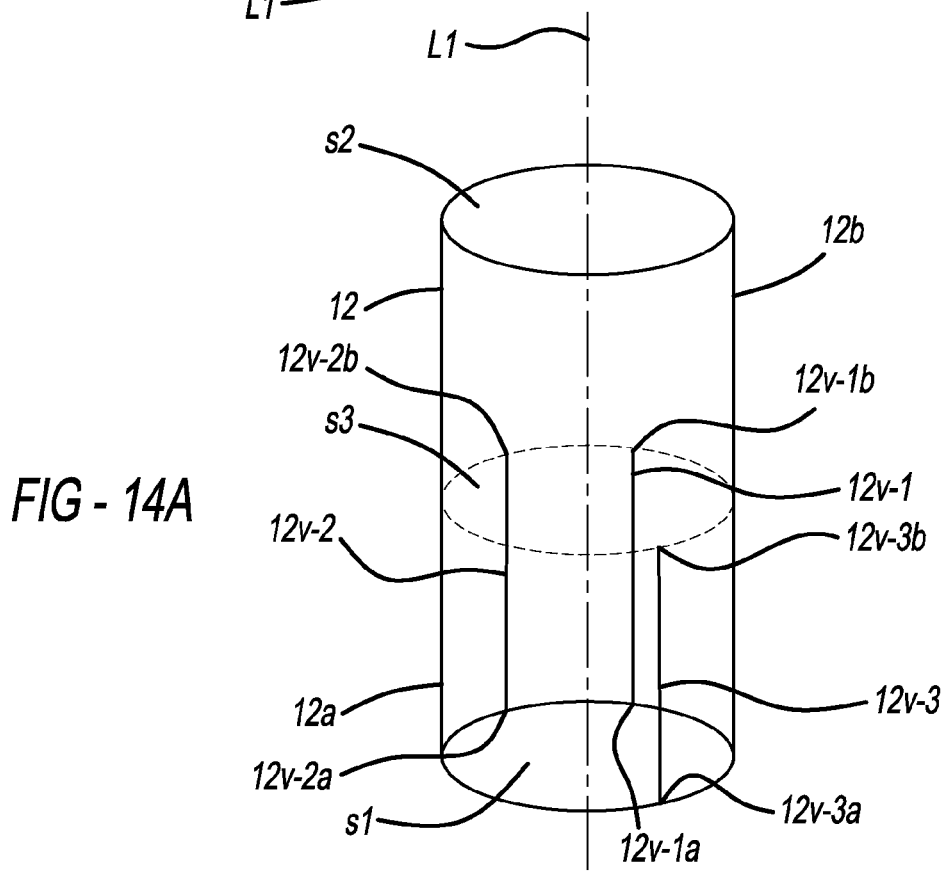

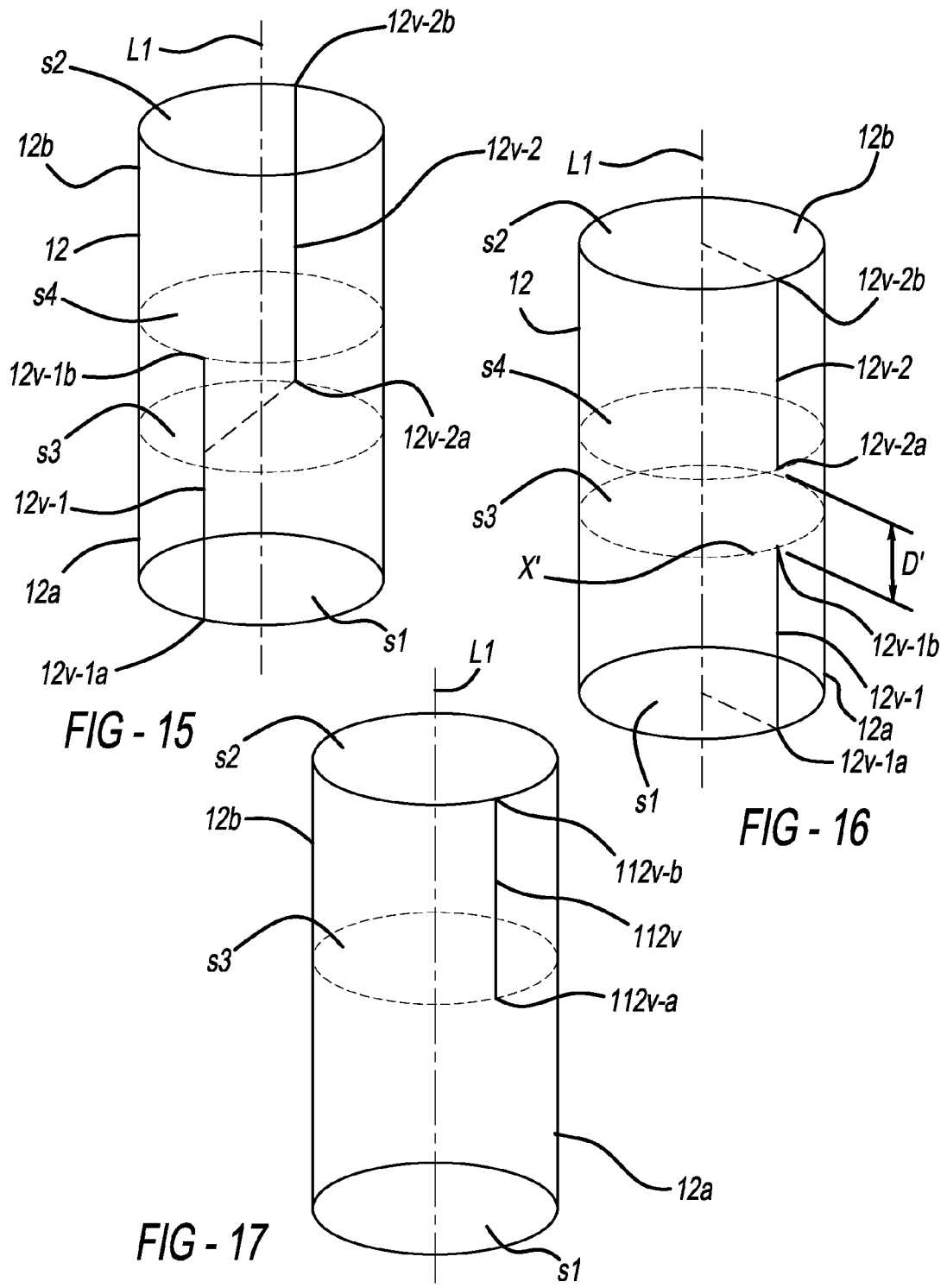

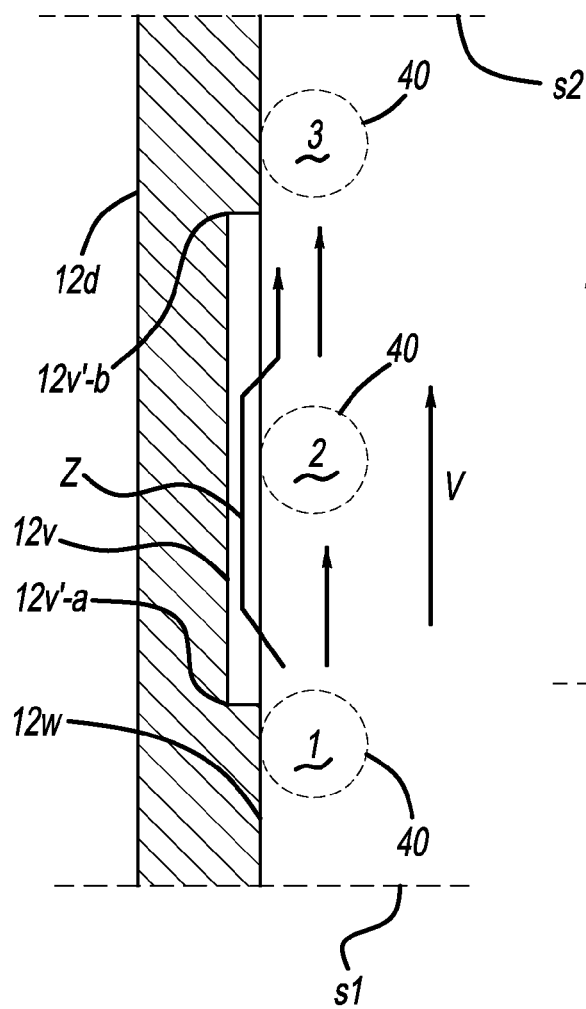
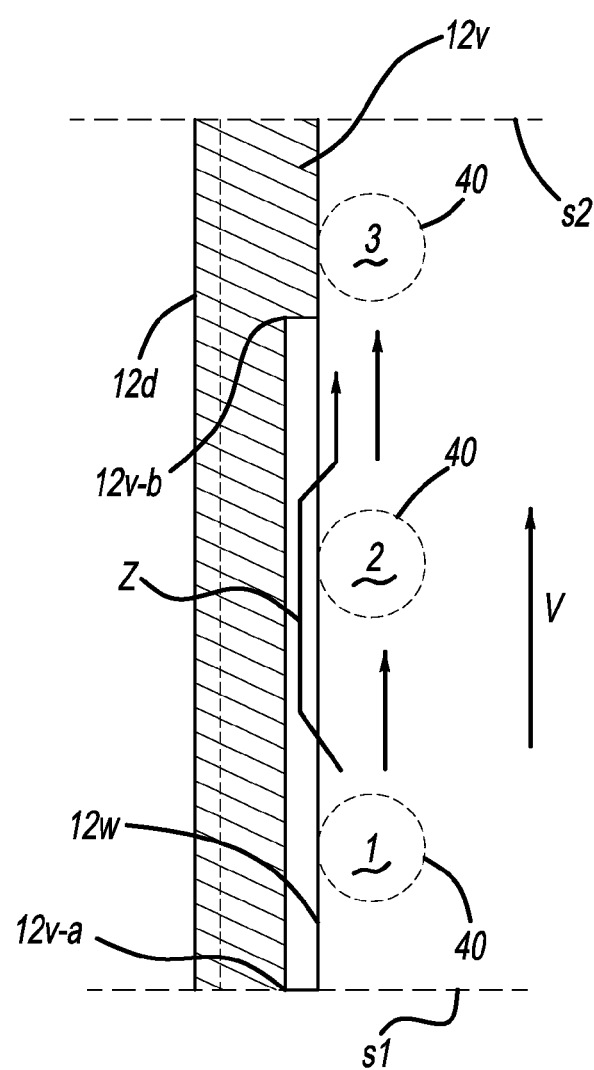
FIG - 20
FIG - 20A

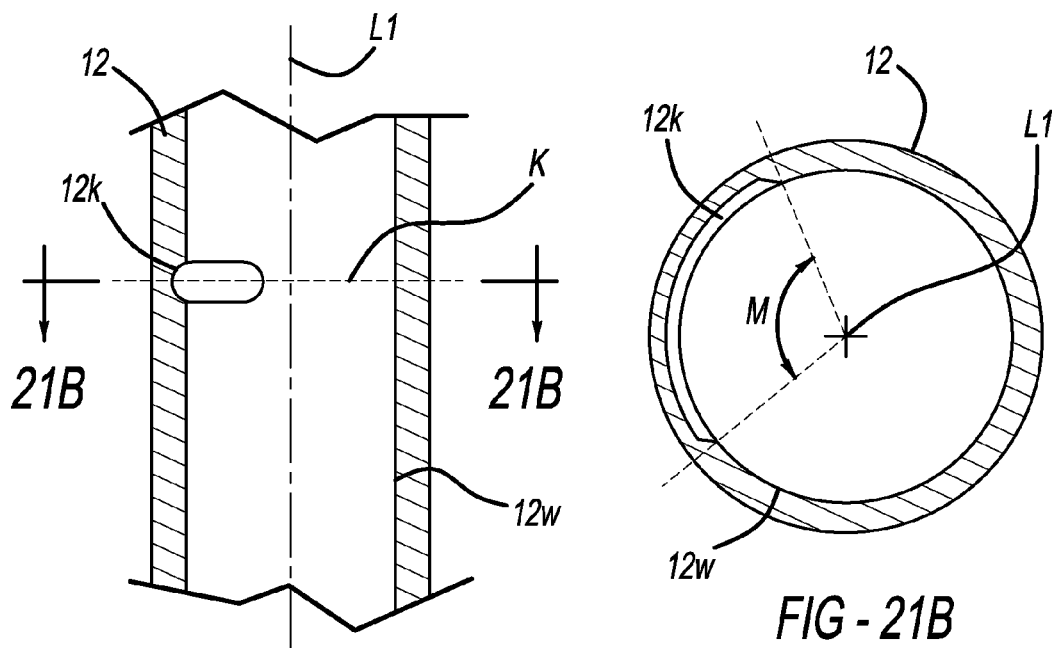
FIG - 21A
FIG - 21B
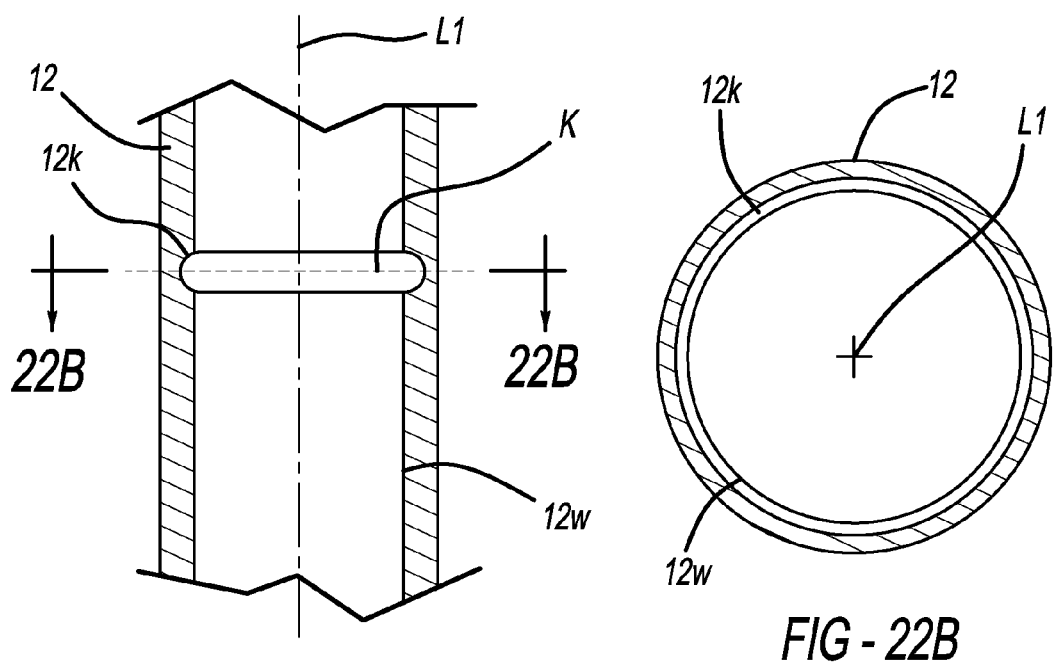
FIG - 22A
FIG - 22B

VENTED PRESSURIZED GAS-POWERED ACTUATOR

CROSS-REFERENCE TO RELATED APPLICATIONS

This application claims the benefit of U.S. Provisional Application Ser. Nos. 61/832,553, filed on Jun. 7, 2013, and 61/835,515, filed on Jun. 14, 2013, the disclosures of which are incorporated herein by reference in their entireties.

BACKGROUND OF THE INVENTION

The embodiments described herein generally relate to a vented, pressurized gas-powered actuator and methods and structured usable for controlling an actuation force profile of the actuator.

Various types of actuators may be used to automatically move certain portions of vehicles. These actuators may be configured to exert a force within a predetermined range, or to move elements or the vehicle a desired distance or along a predetermined path. Some actuator designs utilize a piston and an attached piston rod powered by a pressurized fluid, such as a pressurized gas. It is desirable to be able to control the force exerted by the actuator according to the position of the piston or piston rod during various portions of the piston rod stroke.

SUMMARY OF THE INVENTION

In one aspect of the embodiments described herein, a vented pressurized gas-powered actuator is provided. The actuator includes a housing having a central longitudinal axis and an inner surface. The inner surface has a constant radius between first plane and second planes extending perpendicular to the axis. At least one vent groove extends from the inner surface in a direction away from the axis. The at least one groove has a first end intersecting the first plane.

In another aspect of the embodiments of the described herein, a vented pressurized gas-powered actuator housing is provided. The housing includes an inner surface and at least one vent groove extending from the inner surface into the wall.

BRIEF DESCRIPTION OF THE DRAWINGS

FIG. 3 is a cross-sectional end view of a housing incorporating a single vent groove as shown in the embodiment of FIGS. 1 and 2.

FIG. 4 is a cross-sectional side view of the housing embodiment shown in FIGS. 1-3.

FIG. 5 is a partial perspective view of a portion of an exterior of the housing shown in FIGS. 1 and 2.

FIG. 9 is a cross-sectional side view of a portion of a housing incorporating an embodiment of a vent groove having a varying cross-sectional area.

FIG. 10 is a cross-sectional side view of a portion of a housing incorporating another embodiment of a vent groove having a varying cross-sectional area.

FIG. 14 shows a cross-sectional end view of a portion of an actuator including a housing having three angularly equally spaced vent grooves.

FIG. 14A shows a schematic view of a housing incorporating the vent groove arrangement shown in FIG. 14.

FIG. 15 is a schematic view of another actuator housing embodiment incorporating an alternative vent groove arrangement.

FIG. 16 is a schematic view of another actuator housing embodiment incorporating an alternative vent groove arrangement.

FIG. 17 is a schematic view of another actuator housing embodiment incorporating an alternative vent groove arrangement.

FIG. 20 is a cross-sectional side view of a portion of a housing incorporating an exemplary vent groove, showing the basic principle of operation of the embodiments described herein.

FIG. 20A shows a cross-sectional side view of a portion of a housing incorporating a particular embodiment of the vent groove as shown in FIGS. 1-6.

FIG. 21A is a cross-sectional side view of a housing incorporating a vent groove in accordance with another embodiment described herein.

FIG. 21B is a cross-sectional end view of the housing shown in FIG. 21A.

FIG. 22A is a cross-sectional side view of a housing incorporating a vent groove in accordance with another embodiment described herein.

FIG. 22B is a cross-sectional end view of the housing shown in FIG. 22A.

DETAILED DESCRIPTION

Figure 1:
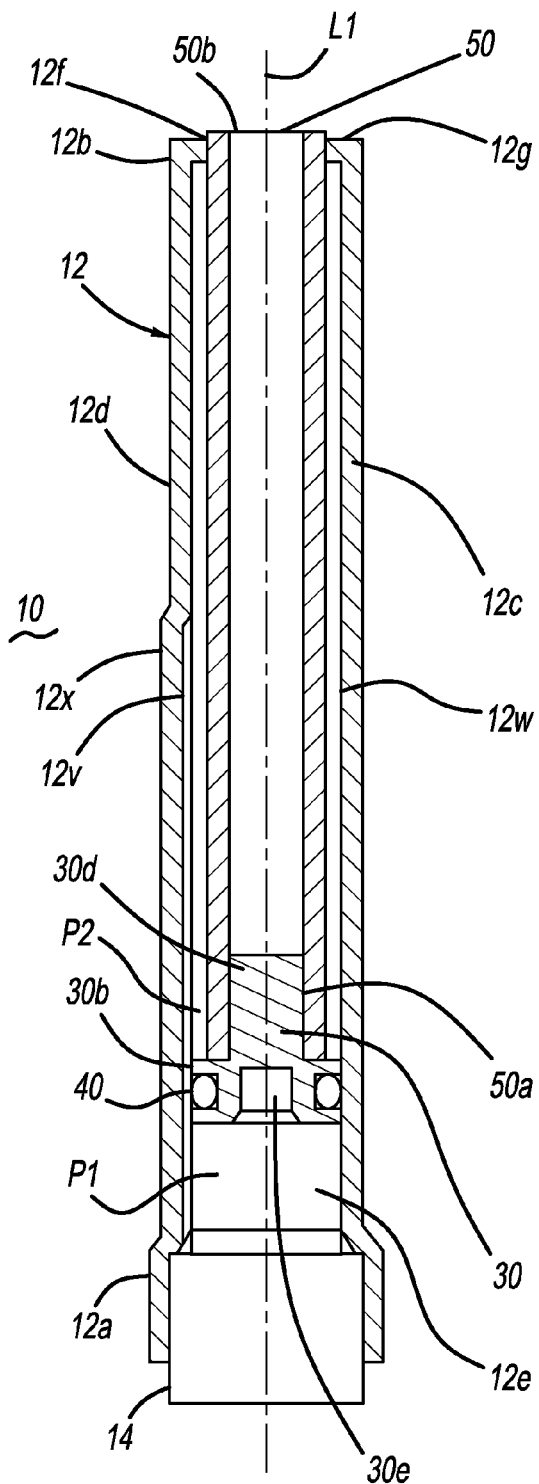
FIG. 1 is a cross-sectional side view of one embodiment of a vented pressurized gas-powered actuator prior to activation of the actuator.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-22 show various embodiments of a vented pressurized gas-powered actuator, generally designated 10. The actuator 10 may be operatively coupled (via piston rod 50, described in greater detail, below) to any suitable device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. One possible application for an actuator as described herein is in lifting a portion of a hood of an automotive vehicle.

Any of the elements of any embodiment of an actuator described herein may be formed from any suitable material or materials. For example, housing 12 may be formed from a metallic material (for example, stainless steel), a polymer, or any other suitable material or materials.

In the embodiment shown in FIGS. 1-6, actuator 10 has a housing 12, a piston 30 slidably positioned within the housing, and a piston rod 50 attached to the piston so as to move in conjunction with the piston. In the embodiment shown, housing 12 is cylindrical and has an outermost housing wall 12d defining a first end 12a, a second end 12b and a body 12c connecting the first and second ends. Wall 12d also defines a hollow interior 12e of the housing. In the embodiment shown in FIGS. 1-6, housing first end 12a is flared radially outwardly to accommodate a suitable gas generator 14 (for example, a known micro-gas generator) to be inserted and retained therein by crimping, adhesive attachment, or any other suitable method. Alternatively, the gas generator 14 may be attached to housing first end using a suitable retention method. A gas-emitting portion 14a of the gas generator 14 is positioned within the housing so that generated gases flow into the housing interior 12e after activation of the gas generator. If desired, a suitable seal (such as an epoxy seal, O-ring seal or other sealing means; not shown) may be provided to prevent or minimize leakage of generated gas between the gas generator 14 and the housing 12 to an exterior of the housing.

An interior surface 12w of wall 12d has a constant radius measured from housing central longitudinal axis L1 and is structured to permit sliding engagement of a resilient seal 40 therealong, as described in greater detail below. Seal 40 is mounted on a piston 30. In the embodiments shown in herein, housing inner surface 12w defines a cylindrical volume, and the vent groove(s) described herein reside outside but adjacent to this cylindrical volume.

In the embodiment shown in FIGS. 1-6, housing second end 12b has an opening 12f structured to receive therethrough a piston rod 50 attached to a piston 30 (described in greater detail below) which is slidably positioned in housing interior 12e. Opening 12f may be sized or otherwise structured to laterally constrain or support to the piston rod 50 as portions of the rod move into and out of the housing through opening 12f. In the particular embodiment shown in FIGS. 1-6, an end wall 12g is formed from a portion of housing 12, and opening 12f is drilled or otherwise formed in the wall 12g. If desired, a reinforcing cap (not shown) may be secured to end 12b of the housing by welding or any other suitable means, to strengthen the housing end against impact forces exerted by the piston 30 contacting the end wall 12g at the end of the piston stroke.

Figure 2:
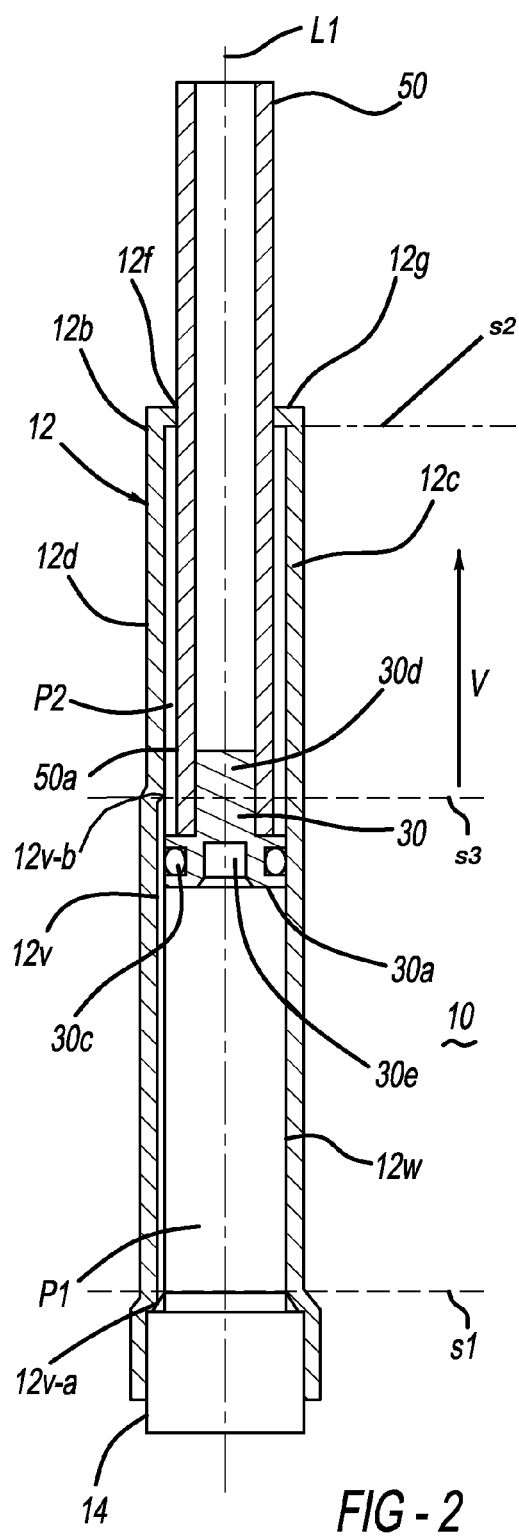
FIG. 2 is a cross-sectional side view of the actuator housing shown in FIG. 1 after activation of the actuator.
Figure 6:
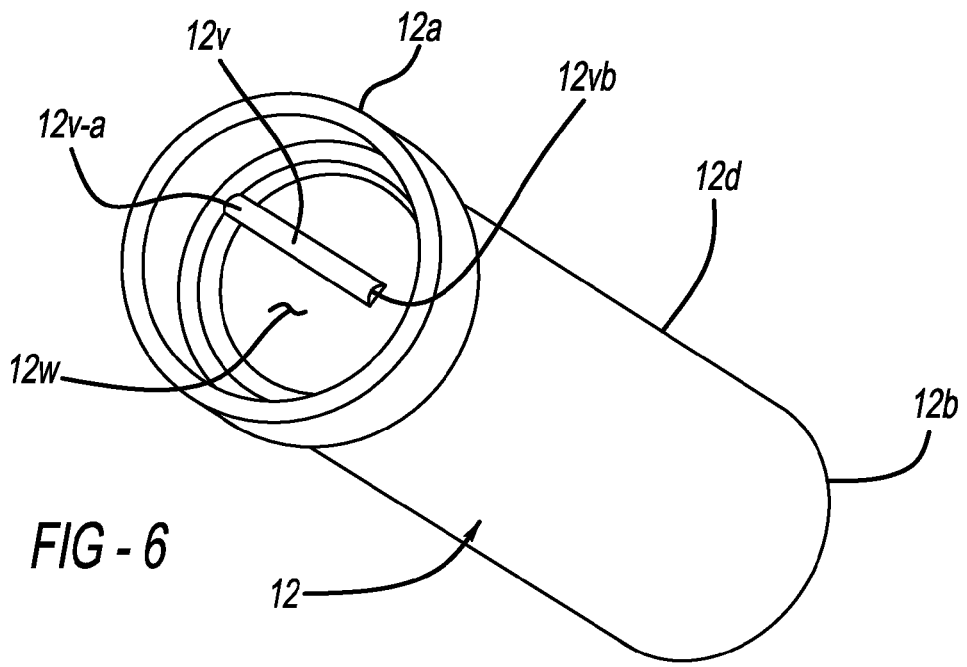
FIG. 6 is a perspective end view of the housing shown in FIG. 5.

Piston 30 is slidably positioned within housing interior 12e. Referring to FIGS. 1 and 2, piston has a base 30a with an outer wall 30b. A groove 30c is formed in wall 30b and is structured for receiving therein a resilient gas-tight seal 40 (for example, a suitable O-ring). In a known manner, seal 40 resiliently engages or contacts the interior surfaces of housing wall 12d, thereby providing a substantially gas-tight seal between the piston 30 and wall 12d. When piston 30 is positioned in housing 12 with seal 40 contacting the housing wall interior surfaces, the region of contact between the seal and the housing wall defines a boundary between a higher pressure side P1 of the piston and a lower pressure side P2 of the piston. Thus, venting will occur through groove(s) 12v (described in greater detail below) as long as gases traveling along the groove(s) pass under the seal 40 (between the seal and the housing wall) from the higher pressure side P1 to the lower pressure side P2 side of the piston.

In the embodiment shown in FIGS. 1-6, a projection 30d extends from piston base 30a. Projection 30d is structured for engaging (or for suitable attachment to) an associated piston rod 50 in an interference fit, or for otherwise enabling or facilitating attachment of the piston rod 50 to the piston 30.

In a particular embodiment, a cavity 30e is formed in base 30a. Cavity 30e provides a void space in the piston which is structured to accommodate therein debris or loosened portions of gas generator 14 (for example, petalled portions of the gas generator) resulting from activation of the gas generator and expulsion of the generated gases), and to confine the initial expansion of the generated gases. This can enable a relatively smaller quantity of gas generant to be used in the gas generator to produce a given effect.

Piston rod 50 is the mechanism through which the actuator force is transmitted to an element (for example, a portion of a hood of a vehicle (shown schematically as element 902 in FIG. 23)) connected to the piston rod. Piston rod 50 has a first end 50a attached to the piston so as to move in conjunction with the piston. A second end 50b of the piston rod opposite the first end may be configured for attachment to an element or mechanism to which the actuator force is to be transmitted. In the embodiment shown in FIGS. 1-6, piston rod 50 is hollow. Alternatively, the piston rod may be solid, or the piston and piston rod may be formed integrally with each other, as a single piece. The piston rod may also have any particular length, diameter, shape and/or other characteristic(s) suitable or necessary for a particular application.

Referring to FIGS. 1-6, at least one vent groove 12v is formed along inner surface 12w of housing wall 12d. In the embodiment shown in FIGS. 1-6, groove 12v is produced by a forming operation which presses a portion 12x of the housing wall outwardly, in a direction away from axis L1 and inner wall surface 12w and into the wall thickness, so as to outwardly stretch or deform an associated portion of the wall. The groove 12v is formed as the stretched portion 12x of the wall 12d is pushed outward. In the embodiments described herein, the vent grooves (with the exception of embodiments of groove 12k shown in FIGS. 21A-22B) extend parallel to housing longitudinal axis L1.

In the embodiment shown in FIGS. 1-6, groove 12v has a first end 12v-a intersecting a first plane s1 extending perpendicular to the axis L1, and a second end 12v-b spaced apart from a second plane s2 extending perpendicular to the axis. Planes s1 and s2 schematically represent the longitudinal ends or limits of the constant radius portions of the housing interior surface 12w, along which venting from the higher pressure piston side P1 to the lower pressure side P2 may be enabled by providing vent grooves along the housing. That is, inner surface 12w (except for the portions along the vent grooves) is located at a constant radius from axis L1 between planes s1 and s2. The piston moves in direction V, with the piston stroke beginning at or about plane s1 and ending at or about plane s2. In the embodiment shown, it is also seen that planes s1 and s2 extend through the inner surface 12w and perpendicular to longitudinal axis of the vent groove.

In the embodiments described herein, planes s1 and s2 also schematically represent the longitudinal ends or limits of the constant radius portions of the housing interior surface 12w along which venting from the higher pressure piston side P1 to the lower pressure side P2 may be enabled by providing vent grooves along the housing. That is, inner surface 12w (except for the portions along the vent grooves) is located at a constant radius from axis L1 between planes s1 and s2. The piston moves in direction V as shown in FIGS. 1-4, with the piston stroke beginning at or about plane s1 and ending at or about plane s2. Venting occurs along grooves formed into surface 12w.

Figure 19A:
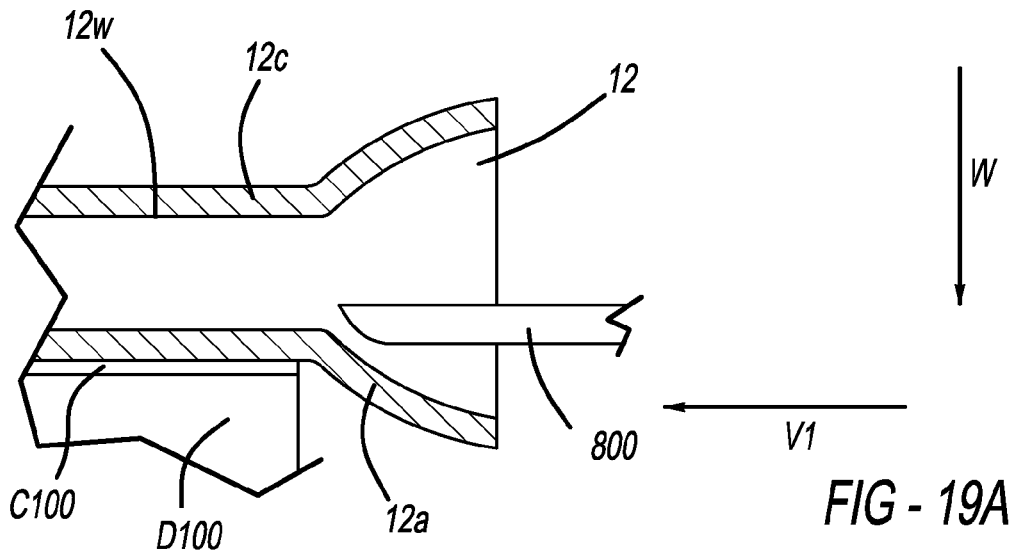
FIGS. 19A-C are cross-sectional schematic views showing one embodiment of the progression of formation of a vent groove in a wall of an actuator housing.
Figure 19B:
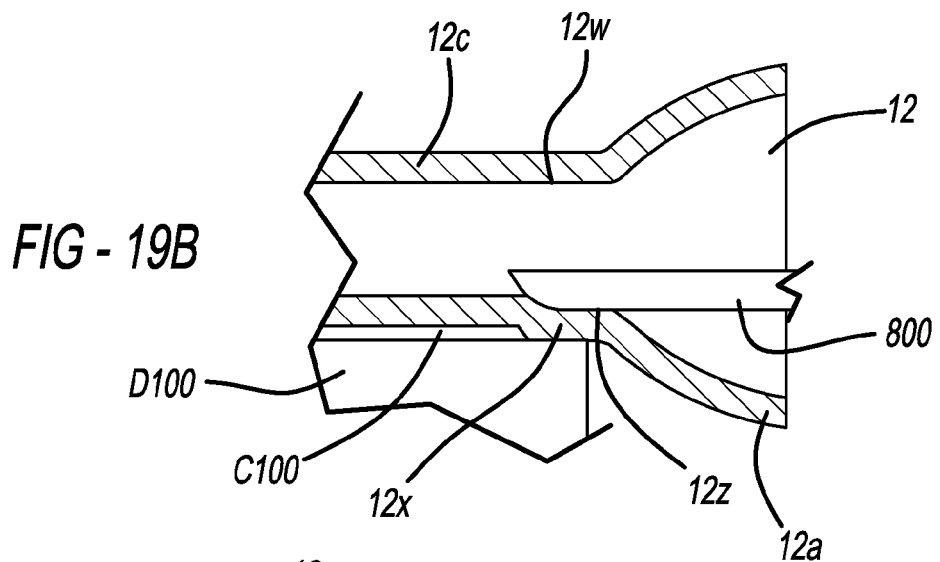
Figure 19C:
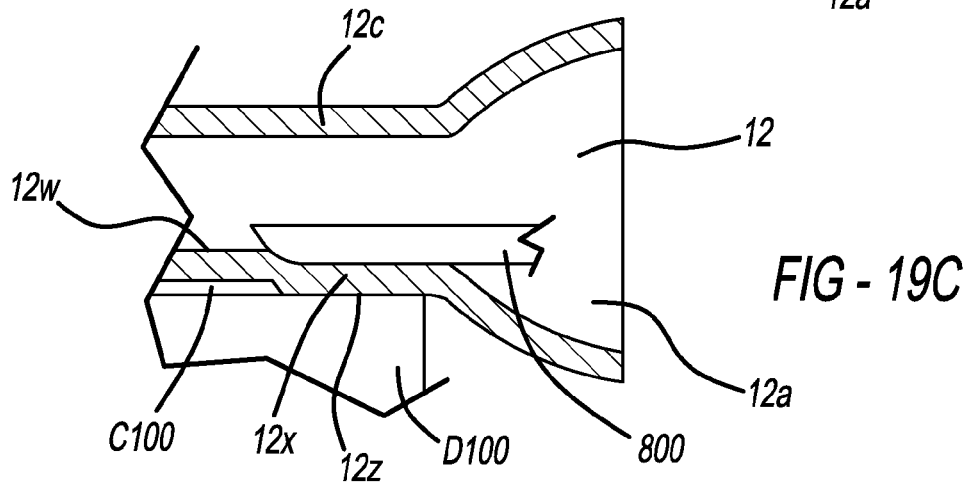

FIGS. 19A-C show the progression of formation of a vent groove 12v starting from an end of housing body portion 12c, using one possible groove formation method. In the embodiment shown, a forming tool 800 is shaped so as to produce a groove having a the desired shape and dimensions, by displacing the material of the housing wall in the direction indicated by arrow W (in a direction away from the housing central axis and into the housing wall) as the tool is inserted into the housing interior from an end thereof in direction V1. The portion 12z of the displaced housing wall material along the exterior of the housing wall flows in direction W and into a cavity C100 of an associated shaping die D100.

In the embodiments described herein, the end of at least one of the vent grooves formed in the housing 12 extends to the end of body portion 12c such that an end of the vent groove is open at one of the housing ends 12a or 12b. Thus, the interior of the housing is able to vent to an exterior of the housing at this location.

In an alternative method of forming a groove or a portion of a groove, the housing 12 is positioned so that its length extends along and rests on a longitudinal base, with a portion of the housing exterior that will reside opposite the internal groove 12v being positioned over a shaping die cavity (such as cavity C100 described above). A press tool is then inserted into an end of the housing. The press tool has a groove forming portion shaped to produce a groove or grove portion having a desired shape (including depth and width) and length when the groove forming portion is pressed into the surface of the interior of housing wall 12d. The groove forming portion of the tool is pressed into the wall 12d in a direction perpendicular to longitudinal axis L1 of the housing 12, thereby forming the groove and deforming a portion of the housing wall outwardly into the shaping die cavity as previously described. Using this method, different portions of the groove can be formed to have different cross-sectional areas along planes taken through housing 12 perpendicular to axis L1. This enables the cross-sectional area of the portion of the groove through which the gas flows around the resilient seal 40 to be controlled at any point along the groove (as seen for example, in FIGS. 9-13). This method also enables formation of a groove that is spaced from either end of the housing 12.

In another alternative method, groove 12v is formed by a broaching operation performed on the housing wall interior surface. In a known manner, the broaching operation removes a desired amount of material from the wall interior surface, thereby reducing the thickness t of the housing wall opposite the groove.

In another alternative method of forming a groove or a portion of a groove, housing 12 is formed from a suitable polymer. Any of grooves 12v may be formed by one of the methods previously described, or the groove(s) may be formed, for example, by molding an insert fabricated into a desired groove profile shape (for example, one of the groove shapes shown herein) into a wall of the polymeric housing. The insert may then be removed from the groove formed into the housing wall after the molded housing has cooled to a sufficient degree.

FIG. 20 is a cross-sectional view of a portion of a housing incorporating an exemplary vent groove 12v', showing the basic principle of operation of the embodiments described herein. The drawing shows piston-mounted seal 40 progressing in direction V along housing inner surface 12w from its pre-activation position, after activation. In position 1, the seal has not yet reached the groove 12v'. Thus gases on higher pressure side P1 are prevented by the seal from reaching the lower pressure side P2 of the piston by contact between the seal and the housing wall inner surface 12w. In position 2, after the seal 40 has passed end 12v'-a of groove 12v', the gases on the P1 side of the piston have a route along the groove and around the seal to the lower pressure side P2 of the piston. The gases continue to flow along the vent groove 12v' as shown by arrow Z, until the seal reaches groove end 12v'-b. In position 3 of the seal, the seal has passed groove end 12v'-b, the groove no longer resides below or outside of the seal. Thus, the gas flow path through the groove is blocked.

The fluid flow rate along the groove (and thus, the actuator force profile) is controlled by controlling the cross-sectional dimensions of the groove ends and the portions of the groove between the ends. These parameters may be varied at various locations along the groove as described herein, in order to achieve a desired force profile.

FIG. 20A shows the particular embodiment 12v of a vent groove shown in FIGS. 1-6, which extends from one end of the constant internal radius portion of the housing along inner wall 12w for at least part of the length of the housing. In the embodiment shown, groove 12v intersects and is open at plane s1 near housing first end 12a. The groove 12v extends into and along wall 12w for a portion of the length of the housing between planes s1 and s2. It is seen that venting occurs along groove 12v from the time motion of piston 30 is initiated (through seal positions 1 and 2 as shown), until the seal reaches groove end 12v-b. In position 3 of the seal, the seal has passed groove end 12v'-b, the groove no longer resides below or outside of the seal. Thus, the gas flow path through the groove is blocked.

The fluid flow rate along the groove (and thus, the actuator force profile) is controlled by controlling the cross-sectional dimensions of the groove ends and the portions of the groove between the ends. These parameters may be varied at various locations along the groove as described herein, in order to achieve a desired force profile.

The actuator force profile (defined herein as the force exerted by the piston rod 50 on an element connected thereto as a function of time) may be controlled by controlling structural features of the actuator, such as the number of vent grooves, the areas of the vent groove(s) (defined for each vent groove as the area bounded by the seal 40 sliding over the groove and the portion of the housing wall 12d defining the edge of the groove at any given cross-section of the housing, shown, for example, as area A in FIG. 3), the length(s) of the vent grooves, the gas output characteristics of the gas generator, and other pertinent factors. The dimensions of these features can be modified to control such characteristics as the total flow rate of gases along the vent grooves and the amount of time venting is enabled.

For example, in the embodiment shown in FIGS. 1-6, because groove 12*v* extends outside or beyond remainder of the housing wall interior surface 12*w*, the groove 12*v* provides a flow path (or vent) for pressurized gases past the seal 40, from the higher pressure side P1 to the lower pressure side P2, when the seal is positioned over the vent groove as shown in FIG. 20A. Gases flowing along the groove 12*v* to the lower pressure side of the piston 30 are then free to flow out of the housing through housing opening 12*f*.

Venting through a portion of the groove is enabled under seal 40 as long as the groove extends to both the higher pressure side P1 of the seal 40 and the lower pressure side P2 of the seal. Stated another way, in the embodiments described herein, venting along a groove will be enabled as long as a gas flow passage exists along the groove and past the seal 40, from the higher pressure piston side P1 to the lower pressure side P2.

In embodiments described herein, the length and position of a vent groove may be specified such that the venting is enabled along only a portion of the stroke length of the piston. In such embodiments, flow of a portion of the generated gases along the vent and past seal 40 would be enabled only for a portion of the piston stroke corresponding to the length and position of the vent groove. In other embodiments of the groove, the length and position of a vent groove may be specified such that the venting is enabled along the entire length of the constant internal radius portion of the housing (i.e., along basically the entire stroke length of the piston).

Figure 8:
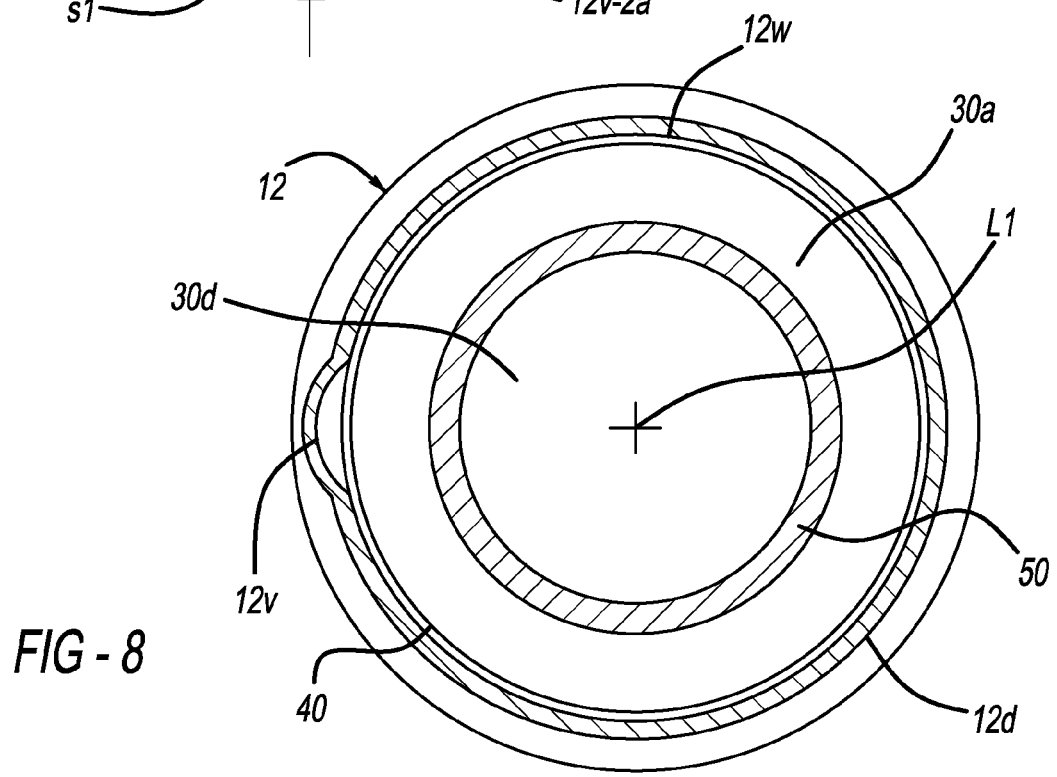
FIG. 8 shows a cross-sectional end view of a portion of an actuator including a housing having a single vent groove as shown in FIGS. 1-6.
Figure 11:
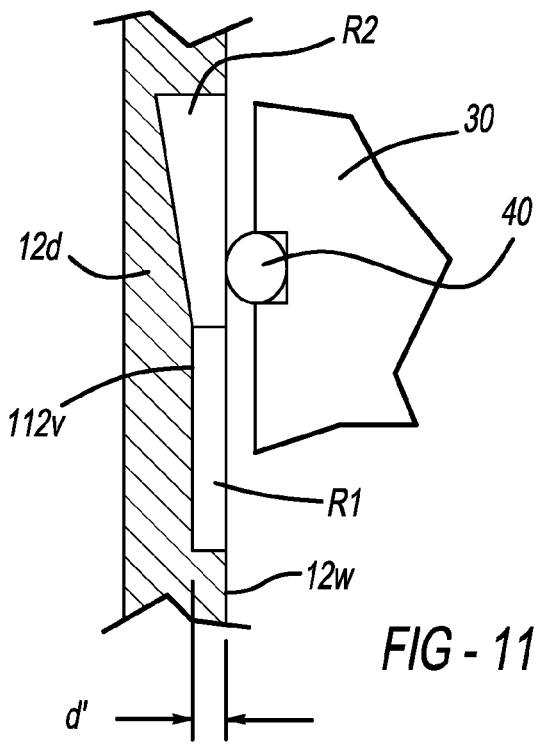
FIG. 11 is a cross-sectional side view of a portion of a housing incorporating another embodiment of a vent groove having a varying cross-sectional area.

In particular embodiments, the positions of the ends of a groove (or grooves) may be specified so as to control the point in the piston stroke at which the onset and/or end of venting occurs. For example, the actuator housing embodiment shown in FIGS. 1-6 includes a groove 12*v* structured to enable venting to commence at the start of the piston stroke and along the portion of housing 12 along which vent 12*v* extends. Groove first end 12*v-a* is thus located so as to enable venting at the start of the piston stroke. After the seal 40 passes an opposite end 12*v-b* of the groove, further groove venting is disabled until the piston reaches the end 12*b* of the housing. FIG. 8 is a plan view of the actuator embodiment shown in FIGS. 1-6.

FIG. 4 shows a side cross-sectional side view of the housing embodiment shown in FIGS. 1-3. In a particular embodiment of the housing. In this embodiment, the groove 12*v* is formed along the length of the housing such that groove end 12*v-b* is a distance H of 30 millimeters from an interior surface of housing endwall 12*g*. Also, in this particular embodiment of the actuator, groove end 12*v-a* is located along plane s1.

In the embodiment shown in FIGS. 1-6, a single groove 12*v* is incorporated into the housing. Venting is enabled starting at groove end 12*v-a* and is enabled all the way until the piston reaches 12*v-b*, at an opposite end of the groove.

In other embodiments, multiple vent grooves may be spaced apart along the housing wall interior surface. For example, FIGS. 7, 7A, 9, 14, 14A, 15 and 16 show schematic views of actuator housings having multiple spaced apart grooves, 12*v*-1 and 12*v*-2.

Figure 7:
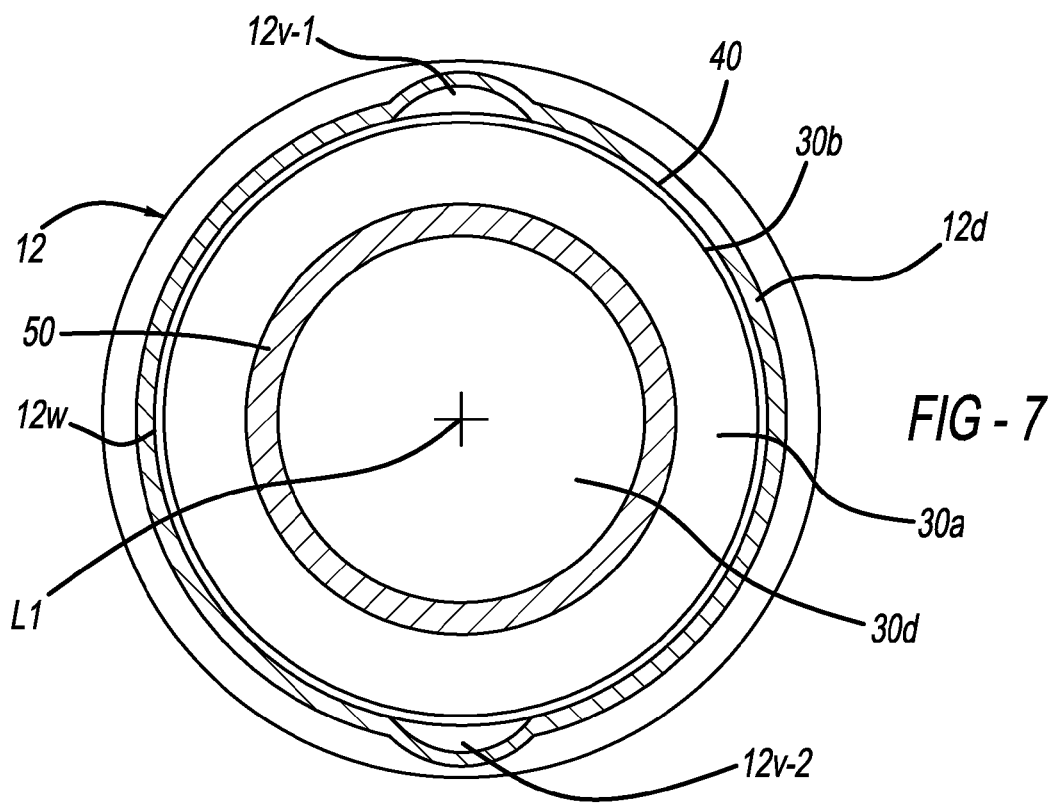
FIG. 7 shows a cross-sectional end view of a portion of an actuator including a housing having two diametrically opposed vent grooves, similar to the groove 12v shown in FIG. 3.
Figure 7A:
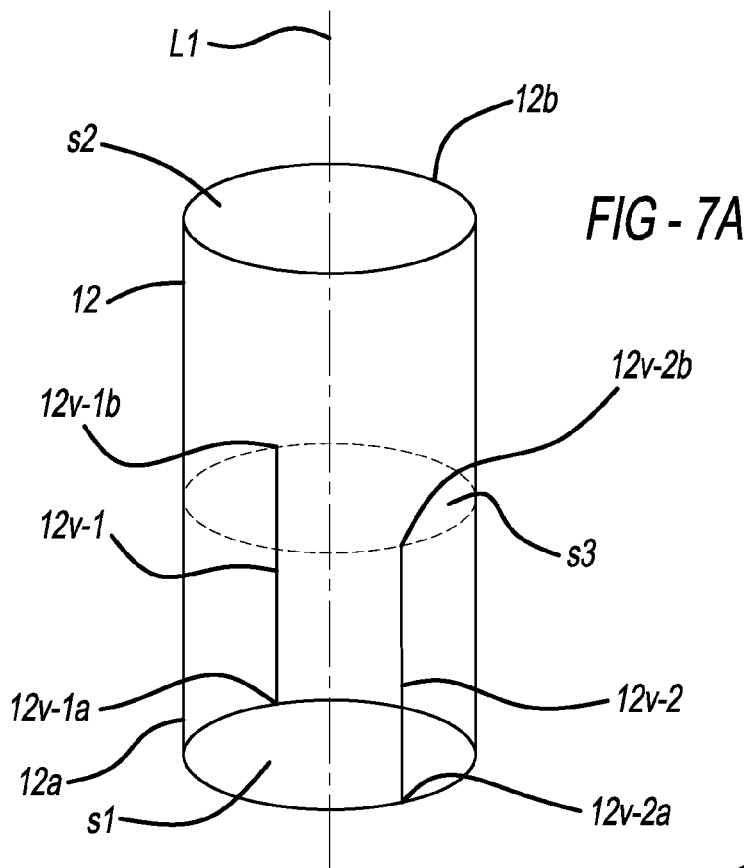
FIG. 7A is a schematic view of a housing incorporating the vent groove arrangement shown in FIG. 7.

FIG. 7 shows a plan cross-sectional view of a portion of an actuator housing having two diametrically opposed vent grooves 12*v*-1 and 12*v*-2. FIG. 7A shows a schematic view of a housing incorporating the vent groove arrangement shown in FIG. 7. In a particular embodiment, grooves 12*v*-1 and 12*v*-2 have equal lengths and are coextensive along the housing (i.e., the beginnings of the grooves are located along a common plane s1 extending perpendicular to the housing longitudinal axis L1, and the ends 12*v*-1*b* and 12*v*-2*b* of the grooves are located along another common plane s3 extending perpendicular to the housing longitudinal axis L1 and located spaced apart from the first plane). Thus, in this embodiment, venting through both grooves commences at the same time and ends at the same time as the piston travels in direction V.

In any embodiment incorporating multiple grooves, each groove may have any desired length and relative position along the length of housing 12. That is, the grooves may or may not have the same lengths, and may or may not be coextensive with each other, according to the actuation force requirements of a particular application. Also, any desired number of vent grooves may be employed. In addition, although the grooves 12*v*-1 and 12*v*-2 are angularly spaced apart 180°, the angular spacing(s) and/or other distances between any pair of grooves in any set of grooves may be equal or unequal.

Any desired number of vent grooves may be employed. In addition, the angular spacing(s) and/or other distances between pairs of grooves in any set of grooves may be equal or unequal. In addition, the length and position of any vent groove may be specified such that the venting is enabled along only a portion of the stroke length of the piston or along the full length of the piston stroke. In such embodiments, flow of a portion of the generated gases along the vent and past seal 40 would be enabled only for a portion of the piston stroke corresponding to the length and position of the vent groove.

FIG. 14 shows a plan cross-sectional view of a portion of an actuator housing having three angularly equally spaced vent grooves 12*v*-1, 12-*v*2 and 12*v*-3. FIG. 14A shows a schematic view of a housing incorporating the vent groove arrangement shown in FIG. 14. In the embodiment shown in FIGS. 14 and 14A, grooves 12*v*-1, 12-*v*2 and 12*v*-3 all have equal lengths and are coextensive. Groove ends 12*v*-1*a*, 12*v*-2*a* and 12*v*-3*a* intersect plane s1, while opposite groove ends 12*v*-1*b*, 12*v*-2*b* and 12*v*-3*b* intersect a plane s3 located between planes s1 and s2 and extending perpendicular to axis L1.

Another embodiment (shown in FIG. 15) includes at least two grooves 12*v*-1 and 12*v*-2 with overlapping ends. Thus, in the embodiment shown in FIG. 15, a portion of first groove 12*v*-1 extends between a third plane s3 and a fourth plane s4 located between the first and second planes s1 and s2. Also, a portion of second groove 12*v*-2 extends between the third and fourth planes. Groove 12*v*-1 is structured to enable venting to commence at a point 12*v*-1*a* on the groove at the start of the piston stroke. Venting is enabled through the groove 12*v*-1 until the seal passes 12*v*-1*b*, which is the end of groove 12*v*-1. However, during passage of the seal from point 12*v*-1*a* to 12*v*-1*b* along groove 12*v*-1, the seal passes over point 12*v*-2*a* along groove 12*v*-2 (at the end of groove 12*v*-2 closest to plane s1), thereby enabling venting along groove 12*v*-2 as well as along groove 12*v*-1. Venting is now enabled along both grooves until the seal 40 passes point 12*v*-1*b* along groove 12*v*-1, after which venting is enabled only along groove 12*v*-2 until the end 12*v*-2*b* of this groove.

Although FIG. 15 shows an the embodiment having one pair of overlapping grooves, any number of overlapping grooves may be employed as needed to achieve a desired actuation force profile. For example, a single first groove enabling venting during a first portion of the piston stroke may overlap with multiple second grooves, in the manner shown in FIG. 15, to enable venting through these second grooves in a later portion of the piston stroke. Similarly, multiple first grooves enabling venting during a first portion of the piston stroke may overlap with a single second groove, in the manner shown in FIG. 15, to enable venting through this second groove in a later portion of the piston stroke.

Another embodiment (shown in FIG. 16) includes at least two grooves 12v-1 and 12v-2 having central longitudinal axes arranged along a common plane X' extending through central axis L1, with a space D' between adjacent ends of the grooves. Longitudinal axes of both grooves lie along the plane X' which extends from the housing longitudinal axis L1 to a side of the housing, as shown in FIG. 16. In the particular embodiment shown in FIG. 16, grooves 12v-1 and 12v-2 are coaxial. grooves Groove 12v-1 is structured to enable venting to commence at a point 12v-1a at the start of the piston stroke. Venting is enabled through the groove until the seal passes 12v-1b, which is the end of groove 12v-1 and intersects a plane s3 extending perpendicular to axis L1. Venting is then disabled until the seal reaches end 12v-2a of groove 12v-2 which is an end of groove 12v-2 intersecting another plane s4 spaced apart from plane s3 and extending perpendicular to axis L1. Venting is then enabled along groove 12v-2 until end 12v-2b of groove 12v-2 is reached.

In the embodiment shown in FIG. 17, a single vent groove 112v similar to that shown in FIGS. 1-2 is formed so as to extend from the second end 12b of the housing 12, rather than from the first end 12a of the housing. Venting along this groove is enabled when the piston seal 40 reaches groove end 112v-a, which intersects a plane s3 extending perpendicular to axis L1. If desired, multiple vent grooves can be formed extending from housing second end 12b, in a manner similar to that shown in FIG. 14A.

In the embodiment shown in FIGS. 1-6, groove 12v has a constant cross-sectional area (within the limits of manufacturing tolerances) along its entire length. In any of the embodiments described herein, the grooves (where multiple grooves are incorporated into the housing) may have the same cross-sectional areas or different cross-sectional areas.

In addition, the cross-sectional area of any particular groove may be varied along its length as another means of affecting the actuator force profile. Control of the area through which the gases may flow enables a controlled variation of the gas flow or venting rate as the piston travels along the groove.

For example, in the embodiment shown in FIG. 9, the depth d' of groove 112v varies along the length of the groove. This variation in groove depth d' produces a corresponding variation in groove cross-sectional area along the length of the groove. In the embodiment shown in FIG. 9, the groove 112v is tapered so that the depth d' of the groove varies at a uniform rate along the length of the groove. However the cross-sectional area of the groove can be varied in any desired manner that can be fabricated.

In addition (or alternatively), the forming tool may be formed so as to vary the width of the tool therealong. This enables the width of a groove formed in the housing wall to be correspondingly varied during fabrication of the housing.

In other embodiments, any groove may be formed into adjacent portions or sections into "zones" having different characteristics. For example, in the embodiments shown in FIGS. 10 and 11, a first portion R1 of the groove 112v has a constant cross-sectional area, and a second portion R2 of the groove adjacent the first portion has a cross-sectional area which varies along the length of the groove.

Figure 12:
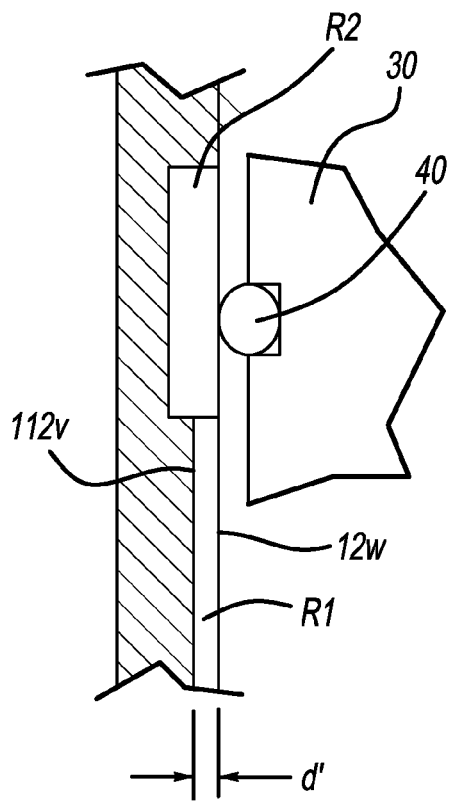
FIG. 12 is a cross-sectional side view of a portion of a housing incorporating another embodiment of a vent groove having a varying cross-sectional area.

In the embodiment shown in FIG. 12, a first portion R1 of the groove 112v has a first constant cross-sectional area, and a second portion R2 of the groove adjacent the first portion has a second constant cross-sectional area different from the first cross-sectional area.

Figure 13:
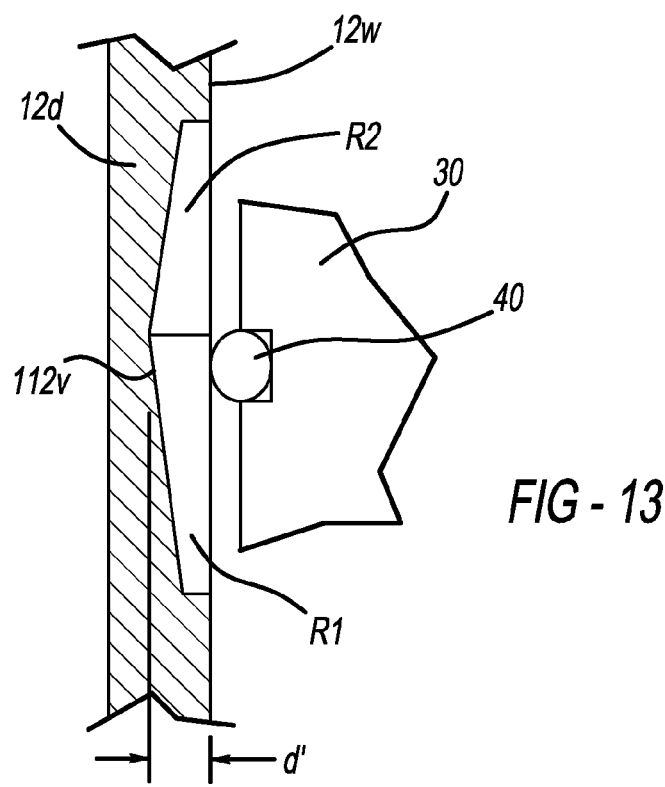
FIG. 13 is a cross-sectional side view of a portion of a housing incorporating another embodiment of a vent groove having a varying cross-sectional area.

In the embodiment shown in FIG. 13, a first portion R1 of the groove 112v has a cross-sectional area which varies along the length of the groove, and a second portion R2 of the groove has a cross-sectional area which varies along the length of the groove.

In view of the above, it may be seen that numerous options exist for providing any of a wide variety of actuator force profiles, using the methods and structures described herein.

During operation of the actuator, the gas generator or other pressurized gas source is activated to introduce pressurized gas into the housing on the higher-pressure side P1 of the piston. The pressurized gas forces the piston in the negative V (−V) direction, whereby a force is exerted by piston rod 50 on an element or mechanism attached thereto. The actuator force profile will be related to the amount of pressurized gas vented through the groove(s) from the higher pressure side P1 of the piston to the lower pressure side P2. At the end of the piston stroke and/or when the seal has passed the groove(s) and is in flush contact with ungrooved surfaces of the housing wall, the gasses remaining in the higher pressure side can continue to escape to some degree from the higher-pressure area to the lower pressure area between the housing wall and the seal until the pressure in the higher-pressure area is nearly equalized with atmospheric pressure. The result is a fully depressurized actuator within seconds of actuator deployment.

Also, in a particular embodiment, prior to activation of the actuator, the piston 30 is positioned such that a portion of at least one vent groove resides on both the higher pressure side P1 (i.e., the gas generator side) and the lower pressure side (i.e., the side of the piston on which the piston rod 50 exits the housing 12) of the seal 40. This enables the housing internal pressures on sides P1 and P2 of the piston to be equalized during assembly of the actuator and prior to actuator activation.

Figure 18:
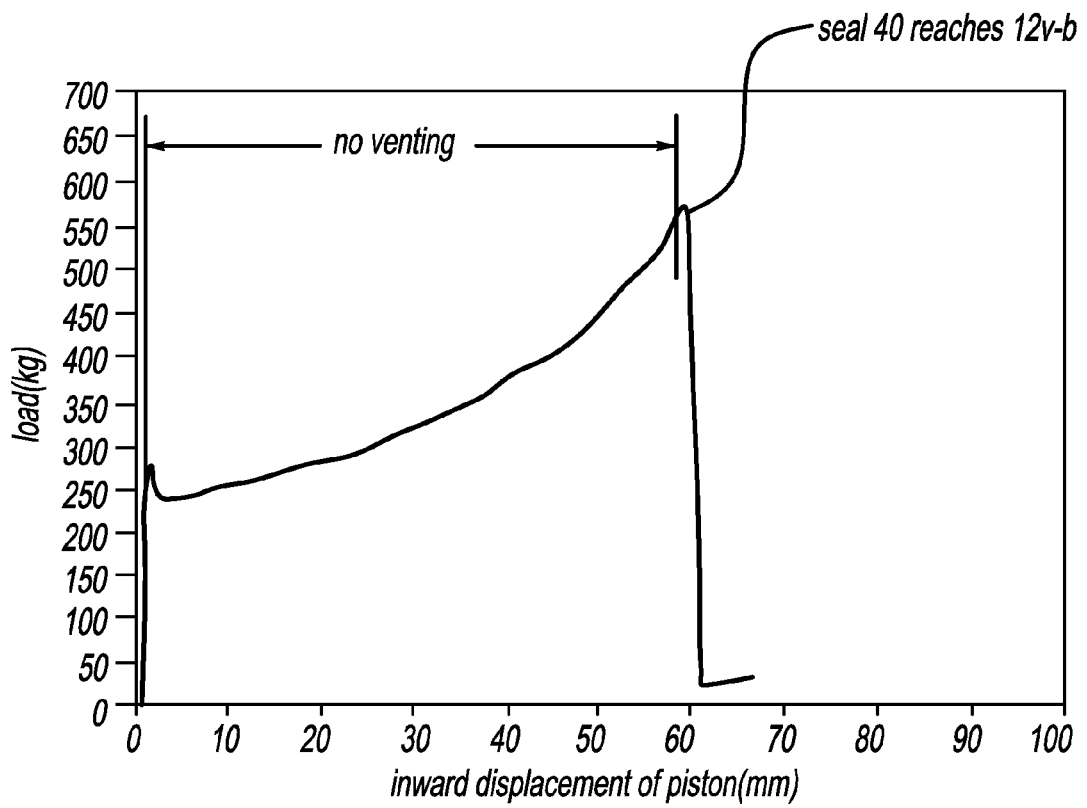
FIG. 18 shows a plot of force exerted by the piston rod vs. displacement of the piston in the negative Y direction for one example of the embodiment shown in FIGS. 1-6.

FIG. 18 shows a plot of force exerted by the piston rod vs. displacement of the piston in the negative V direction in the drawings for the embodiment shown in FIGS. 1-6, after the actuator has been fully deployed (i.e., at maximum travel of the piston). As seen from FIG. 18, as the piston rod 50 is pressed back into the housing, the force resisting displacement of the piston 30 in the −V direction steadily increases until the piston seal 40 reaches a point just past point 12v-b along the groove 12v. At this point, venting of the pressurized gas stored on side P1 of the piston is once again enabled. The gas vents through groove 12v, thereby causing the rapid drop in force resisting further movement of the piston in the −V direction, as shown in FIG. 18.

Referring now to FIGS. 21A-22B, in another embodiment 12k of a vent groove, the length of the groove extends along an axis K residing on a plane that is perpendicular to housing axis L1. The cross-sectional dimensions of the groove may be controlled to provide a relatively rapid or "pulsed" release of gas of a desired amount, from high pressure side P1 to lower pressure side P2, as the seal 40 passes over the groove. The groove 12k may extend along 360 degrees of the surface of wall 12w, thereby forming a continuous "ring", as shown in FIGS. 22A and 22B. Alternatively, the groove 12k may extend along only a specific portion or included angular extent M of the surface 12w, as shown in FIGS. 21A and 21B. These variations enable increased flexibility in control of the actuator force profile. The groove 12k may be formed using one of the groove formation methods described herein.

Figure 23:
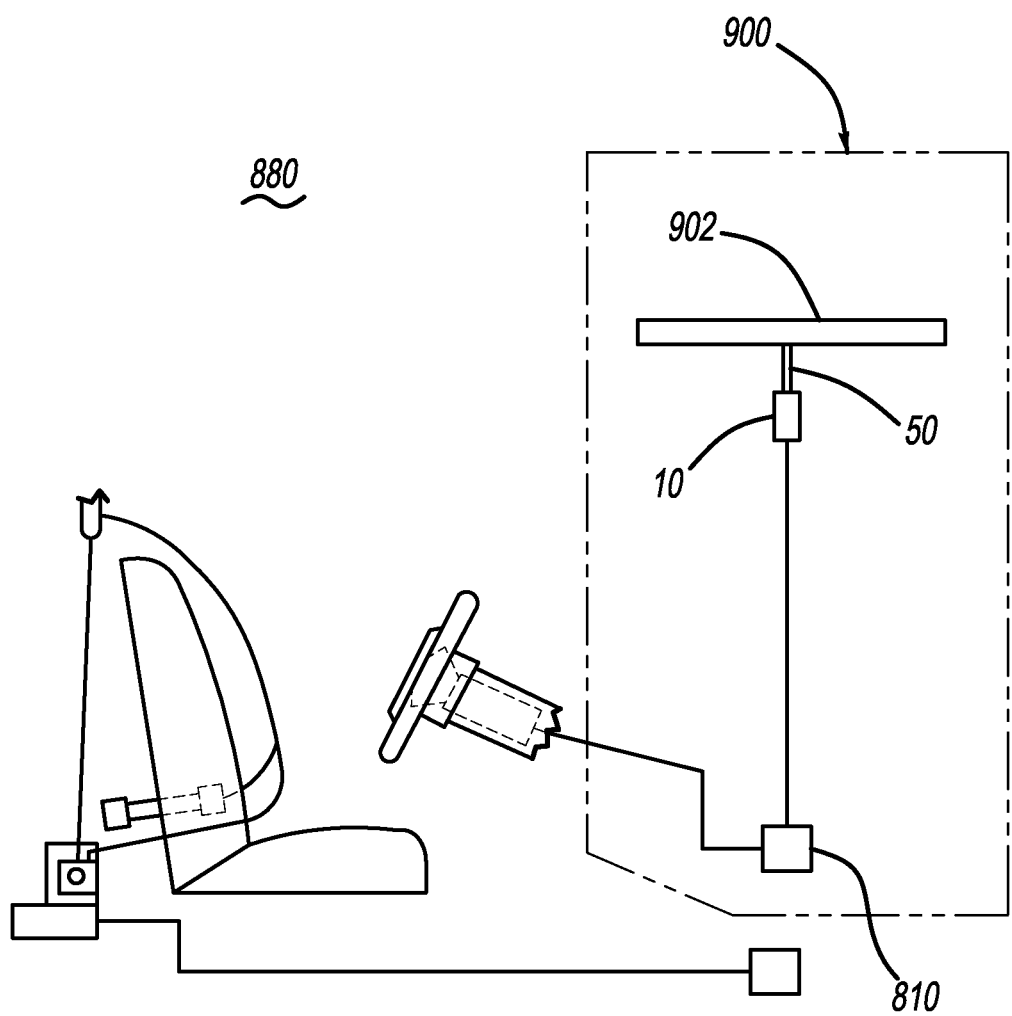
FIG. 23 is a schematic view of a portion of a pedestrian protection system installed in a vehicle and incorporating a hood-lifting device accordance with an embodiment described herein.

FIG. 23 is a schematic view of a portion of a pedestrian protection system 900 installed in a vehicle 880 and incorporating a hood-lifting device 10 in accordance with an embodiment described herein. In this embodiment of the pedestrian protection system 900, a vehicle mounted sensor 810 detects contact between the vehicle and a pedestrian (not shown). Responsive to this detected contact, an activation signal is sent to the hood-lifting mechanism 10, resulting in activation of the gas generator or otherwise releasing pressurized gases into the interior of housing 12 to produce extension of the piston rod 50 from the housing, as previously described. The extending piston rod 50 then raises the portion of the hood 902. The hood-lifter activation signal may be sent from the sensor 810 or from a suitably-configured controller (not shown) which receives the vehicle-pedestrian contact signal from sensor 810 and generates the activation signal in response thereto.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A vented pressurized gas-powered actuator comprising:
A housing having a central longitudinal axis and an inner surface, the inner surface having a constant radius portion between a first plane and a second plane, each plane extending perpendicular to the axis;
at least one vent groove extending from the inner surface in a direction away from the axis, the at least one groove having a first end intersecting the first plane; and
a gas generator coupled to the housing,
wherein said first and second planes represent first and second longitudinal limits of the constant radius portion of the housing inner surface, respectively, and the first plane as compared to the second plane is relatively closer to the gas generator and the second plane is relatively more distant from the gas generator, and,
wherein upon actuation of said actuator, said at least one groove facilitates venting of gases from a high-pressure portion of said actuator to a low-pressure portion of said actuator.

2. The actuator of claim 1 wherein the at least one groove has a second end opposite the first end and intersecting a third plane located between the first and second planes.

3. The actuator of claim 1 further comprising another groove extending from the inner surface in a direction away from the axis.

4. The actuator of claim 3 wherein the other groove has a first end spaced apart from the first plane.

5. The actuator of claim 4 wherein the other groove has a second end spaced apart from the second plane, and wherein the other groove second end is closer to the second plane than to the first plane.

6. The actuator of claim 4 wherein the other groove has a second end intersecting the second plane.

7. The actuator of claim 3 wherein the other groove is coaxial with the at least one groove.

8. The actuator of claim 3 wherein the other groove is positioned diametrically opposite the at least one groove.

9. The actuator of claim 3 wherein a portion of the other groove extends between third and fourth planes located between the first and second planes.

10. The actuator of claim 1 further comprising a piston movably positioned within the housing, the piston having a cavity formed therein along a side of the piston facing the gas generator.

11. A vehicle including an actuator in accordance with claim 10.

12. A vehicle including an actuator in accordance with claim 1.

13. A vented pressurized gas-powered actuator comprising:
a housing having a central longitudinal axis and an inner surface, the inner surface having a constant radius portion between a first plane and a second plane extending perpendicular to the axis;
at least one vent groove extending from the inner surface in a direction away from the axis, the at least one groove having a first end intersecting the first plane; and
a gas generator coupled to the housing,
wherein said first and second planes represent first and second longitudinal limits of the constant radius portion of the housing inner surface, respectively, and the first plane as compared to the second plane is relatively closer to the gas generator and the second plane is relatively more distant from the gas generator, and
wherein upon actuation of the actuator, the at least one vent groove vents gas to an exterior of the actuator.

14. A vented pressurized gas-powered actuator comprising:
A housing having a central longitudinal axis and an inner surface, the inner surface having a constant radius portion between a first plane and a second plane, each plane extending perpendicular to the axis;
at least one vent groove extending from the inner surface in a direction away from the axis, the at least one groove having a first end intersecting the first plane;
a second groove extending from the inner surface in a direction away from the axis; and
a gas generator coupled to the housing,
wherein said first and second planes represent first and second longitudinal limits of the constant radius portion of the housing inner surface, respectively, and the first plane is relatively closer to the gas generator and the second plane is relatively more distant from the gas generator, and,
wherein a longitudinal axis of the other groove intersects a plane that is perpendicular to the housing longitudinal axis; and wherein upon actuation of the actuator, the at least one vent groove vents gas to an exterior of the actuator.

* * * * *